Aug. 28, 1945.  R. F. TABER  2,383,896
EDGING MACHINE
Filed June 21, 1941   8 Sheets-Sheet 1

Inventor
Ralph F. Taber
By
Attorney

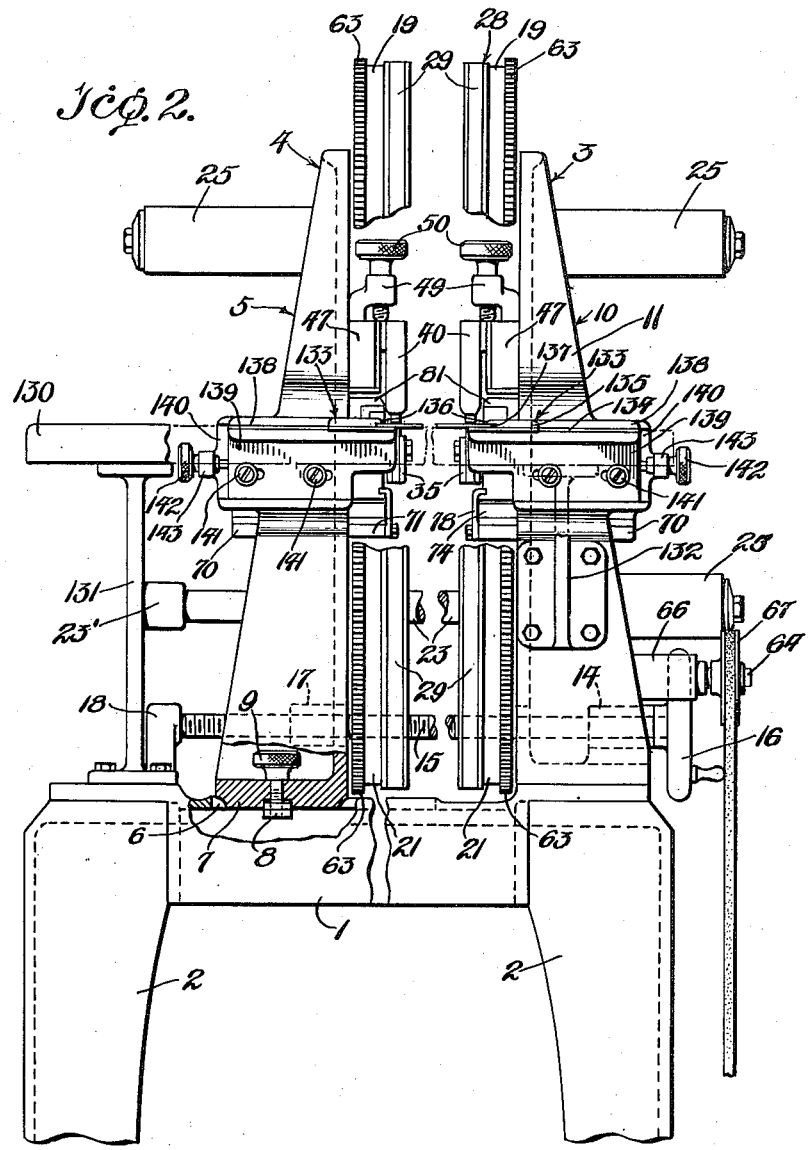
Fig. 2.
Inventor
Ralph F. Taber
By 
Attorney

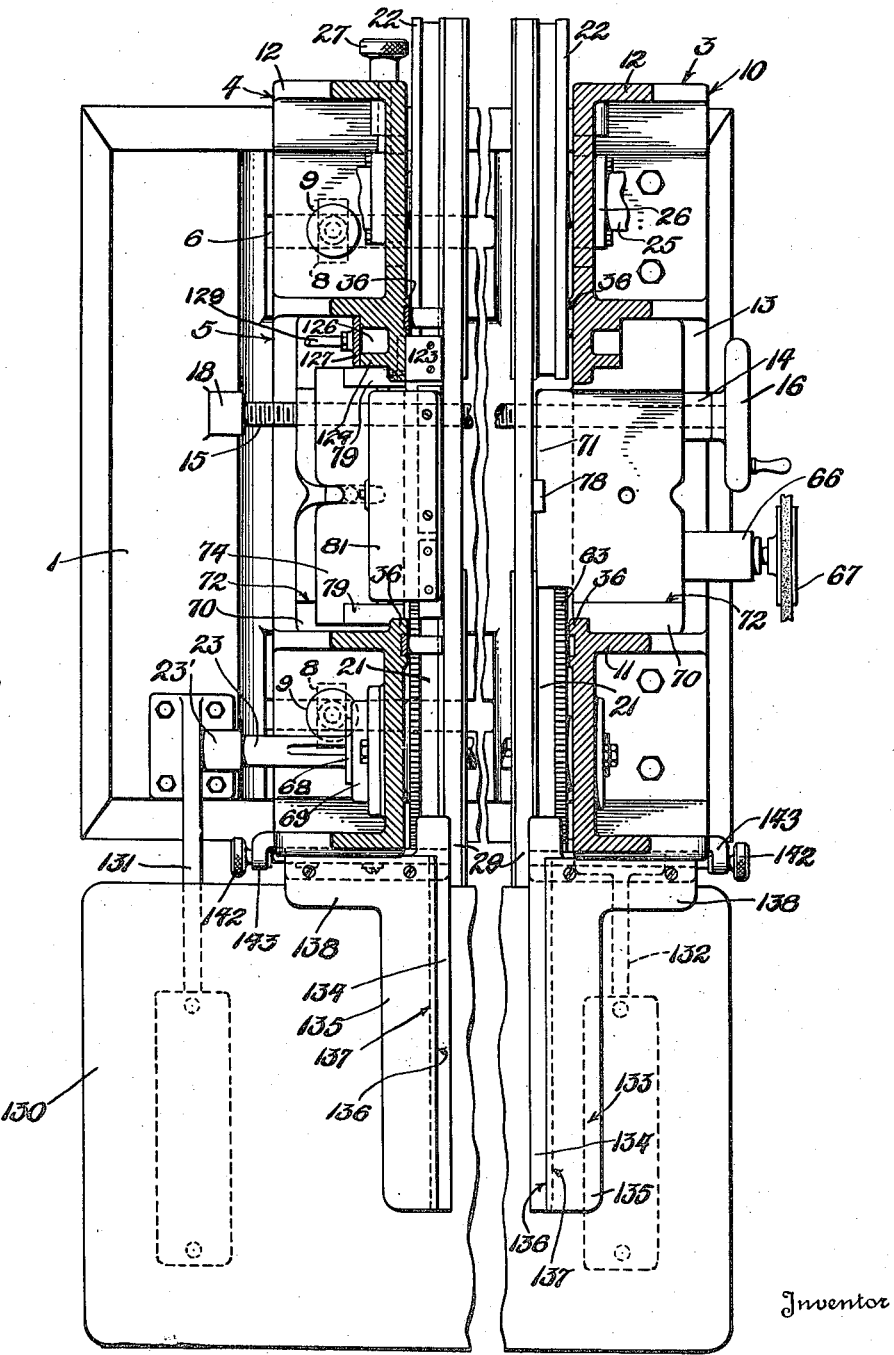

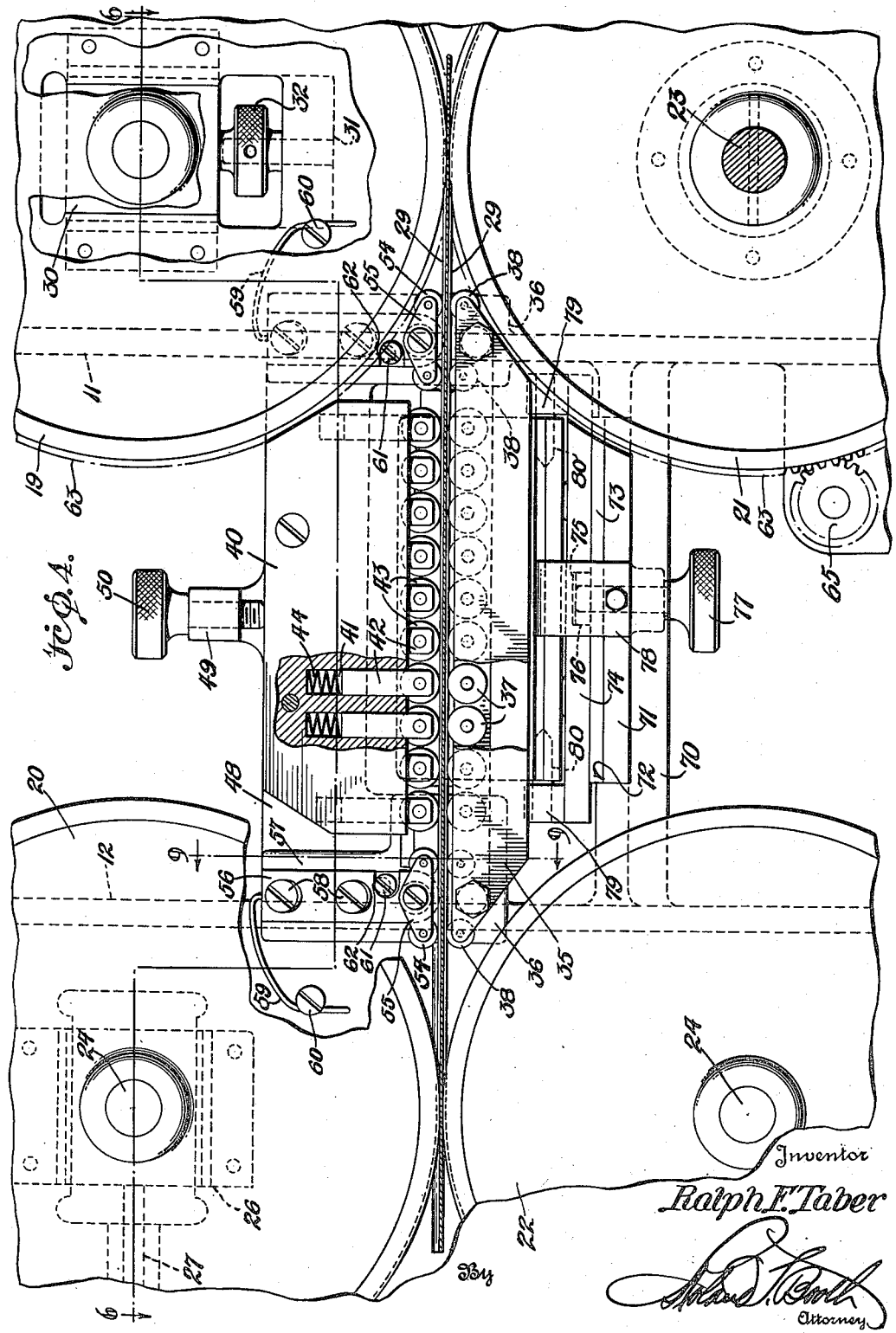

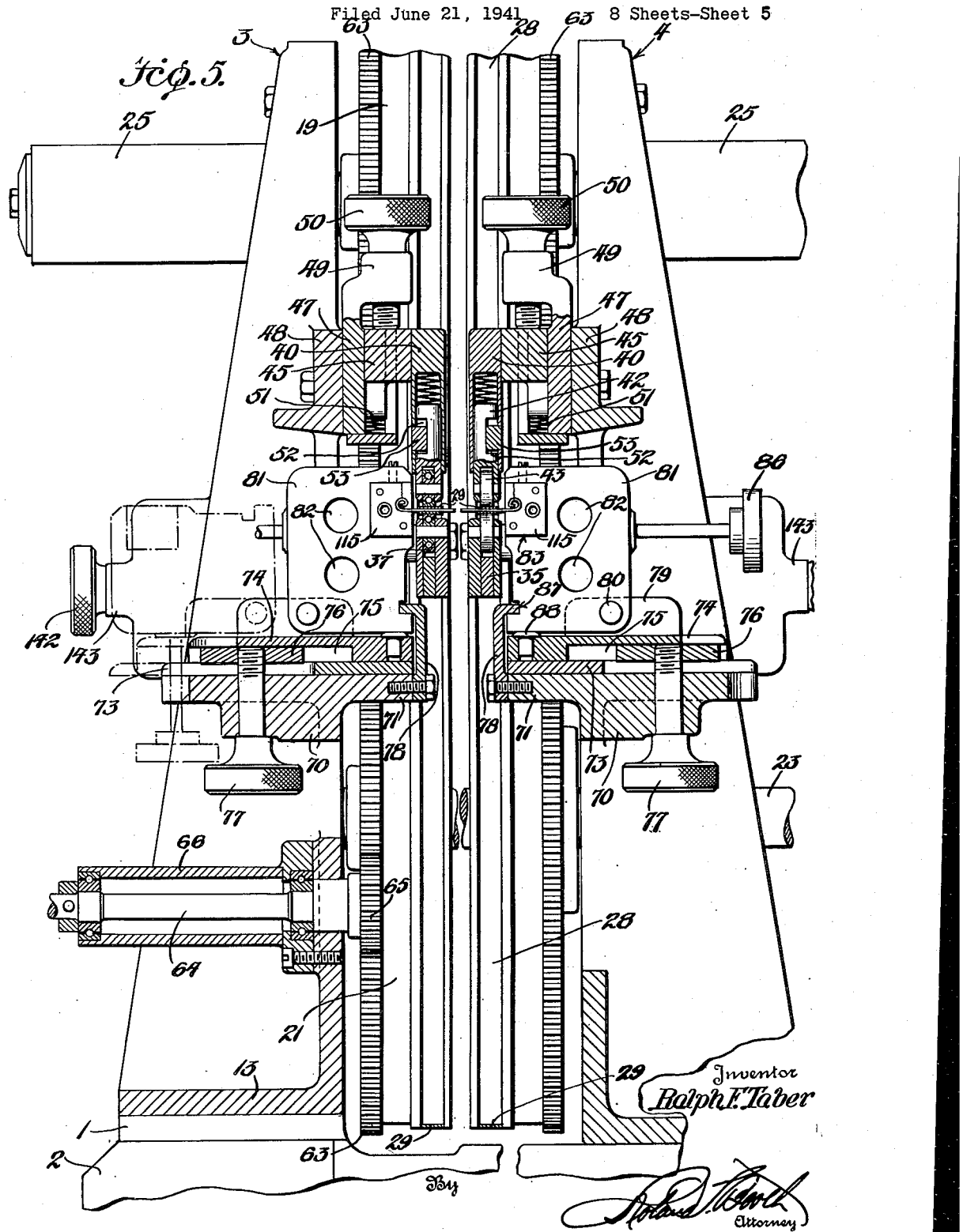

Aug. 28, 1945.　　　R. F. TABER　　　2,383,896
EDGING MACHINE
Filed June 21, 1941　　　8 Sheets-Sheet 6
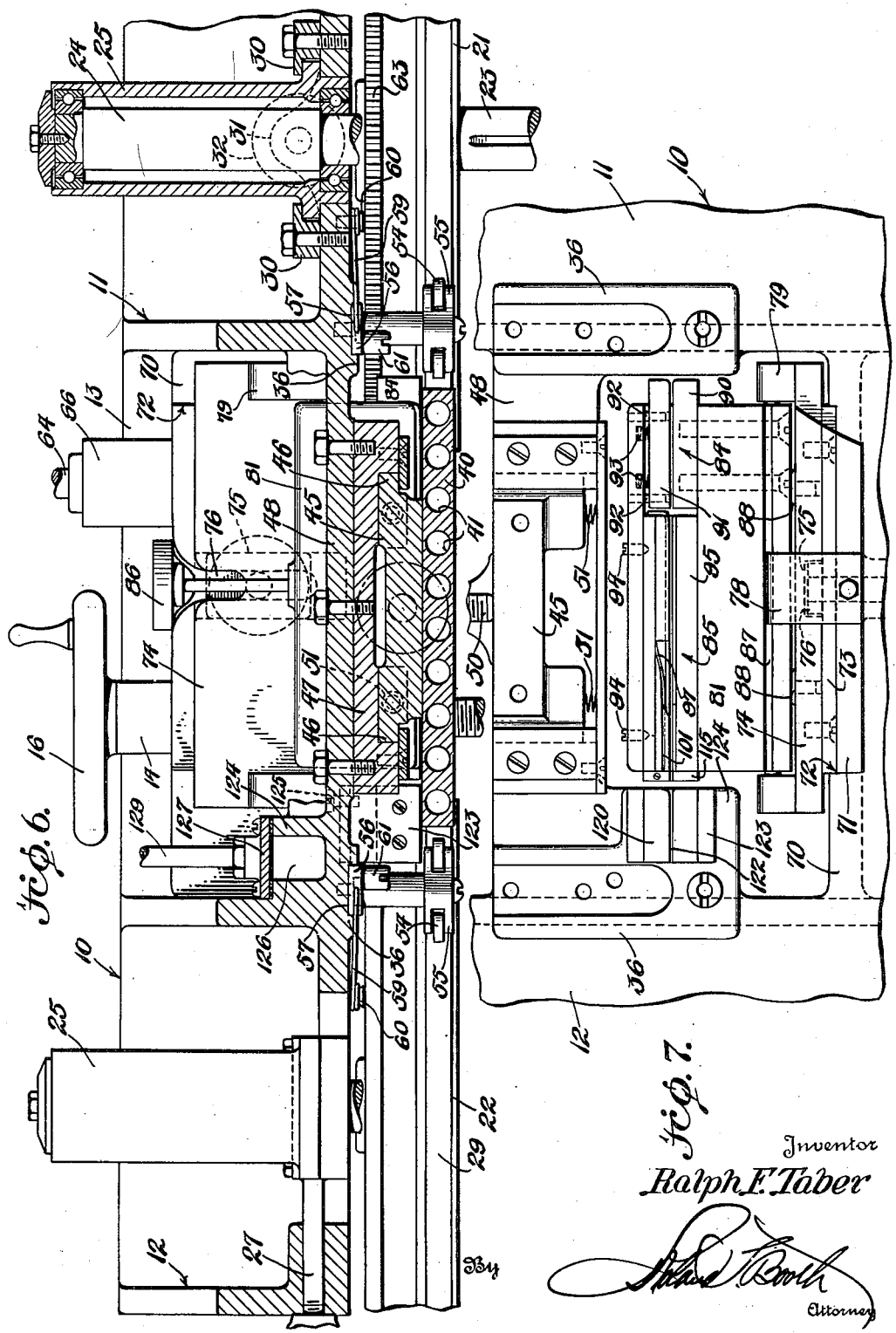
Inventor
Ralph F. Taber Aug. 28, 1945.   R. F. TABER   2,383,896
EDGING MACHINE
Filed June 21, 1941   8 Sheets-Sheet 7
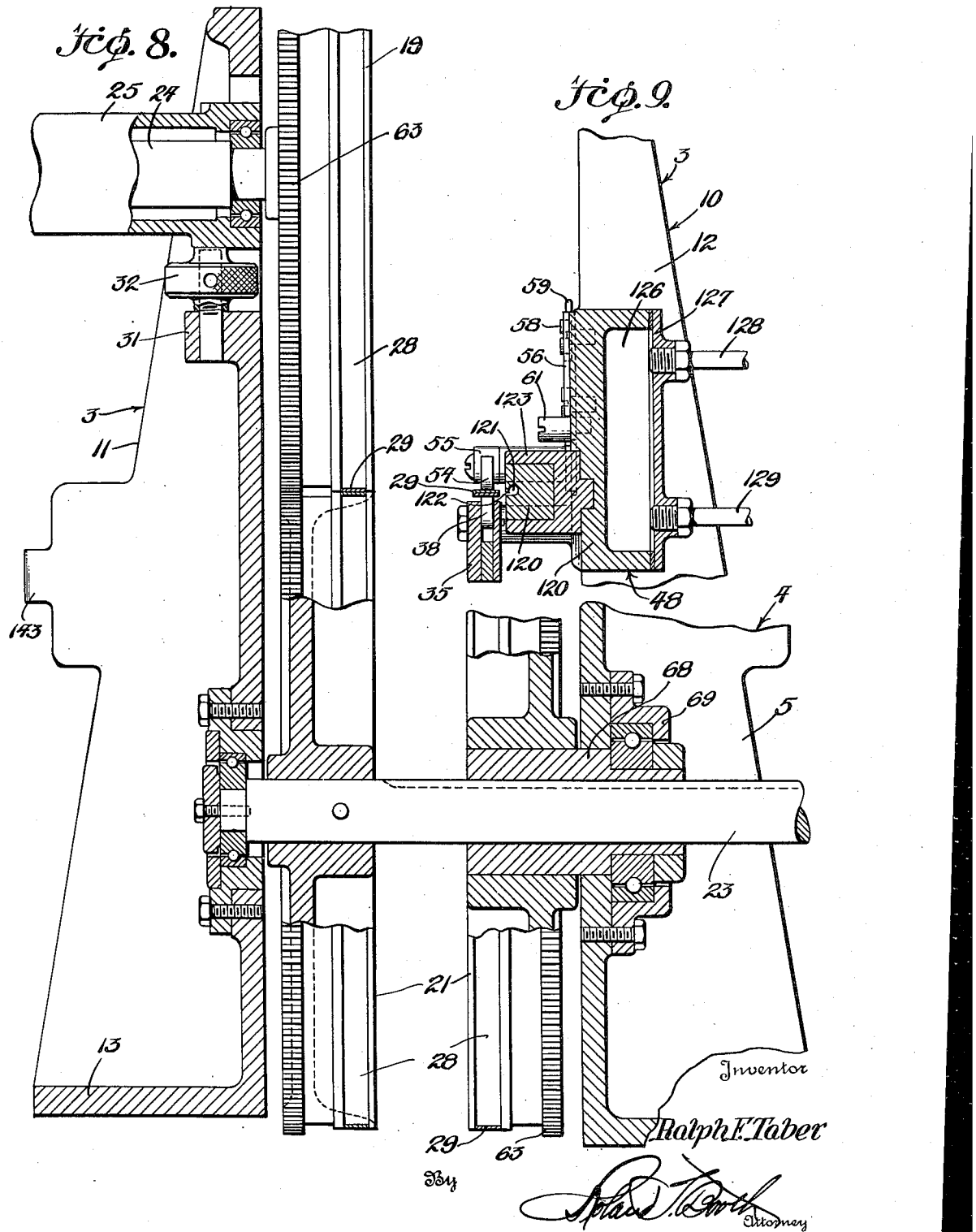
Inventor
Ralph F. Taber
By
Attorney

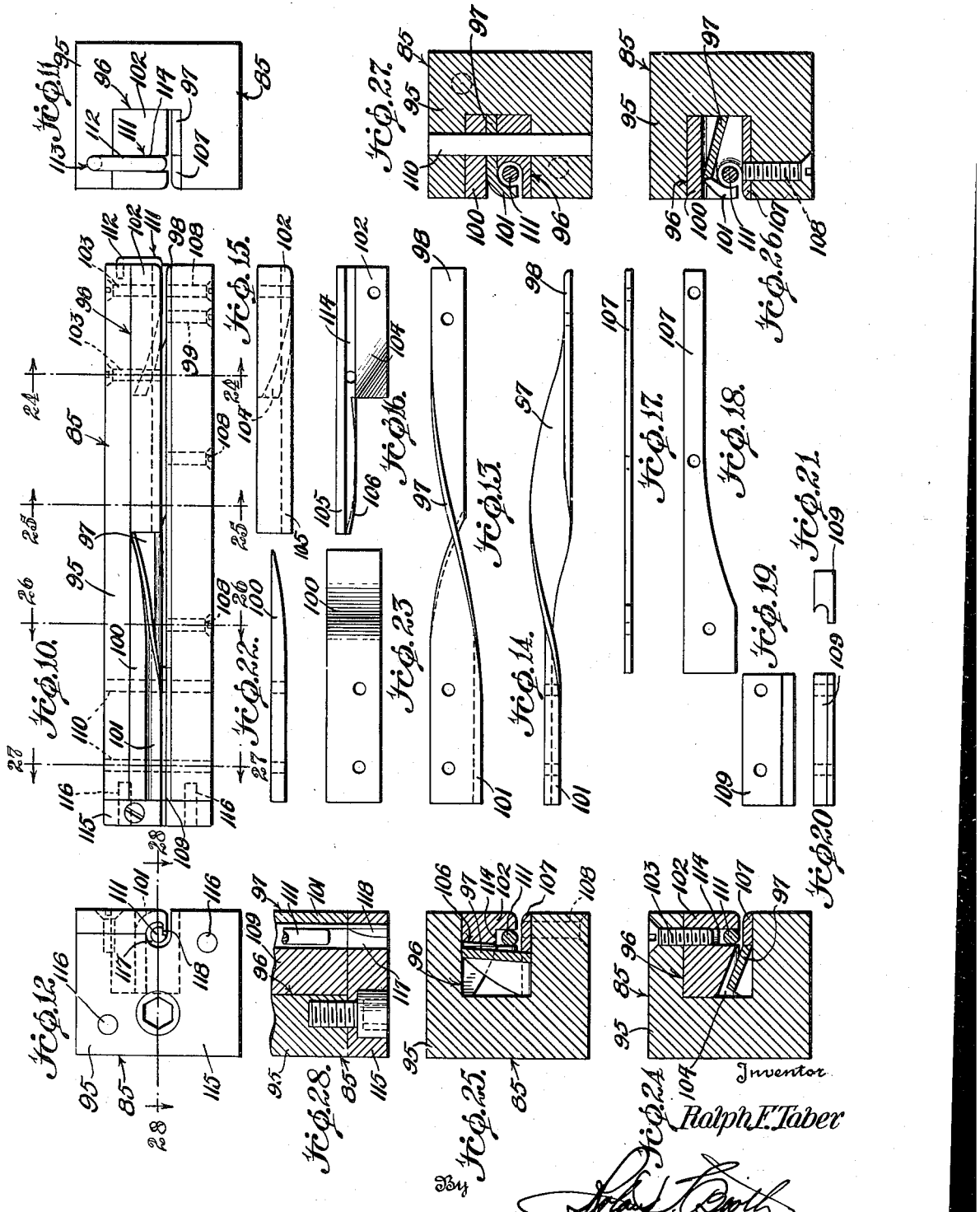

Patented Aug. 28, 1945

2,383,896

UNITED STATES PATENT OFFICE 2,383,896

EDGING MACHINE

Ralph F. Taber, North Tonawanda, N. Y.

Application June 21, 1941, Serial No. 399,147

11 Claims. (Cl. 18—19)

The invention relates to means for producing tubular edges on sheet material.

The invention is directed to a means for forming tubular edges on the margins of transparent and opaque sheet materials for making said materials useful in the manufacture of small boxes and similar products where the tubular beads provide the material with a shape retaining quality.

The invention is well adapted for forming tubular beads on the margins of sheet material formed from cellulose, cellulose esters, resins, phenolic condensation products, and other similar materials known as plastic materials, as distinguished from sheet metal.

The invention provides a means for forming tubular beads on margins of sheet material by a continuous process in which the beads are formed by progressive and continuous operation obtained by gradually and progressively bending the marginal portion of a flat sheet into tubular form until the marginal portion is formed into a complete tubular shape in cross section. The invention provides for the formation of a tubular bead in which the edge of the material is curved inwardly so that the surface of the sheet adjacent the edge thereof engages the surface of the sheet where the bead merges into the flat portion. This provides a bead of greater strength controlled by increasing or decreasing the amount of the turned-in edge.

The invention provides a means for forming tubular edges or beads on sheet material by continuously feeding sheet material through a plurality of zones for successive treatment to first heat and then progressively bend the margin of the sheet material into tubular form with subsequent cooling to cause said material to set in said tubular form and provide a permanent beaded edge.

The invention comprehends a machine having two units for simultaneously forming tubular beads on the opposite edges of a piece of sheet material simultaneously, the units being mounted for adjustment toward and from each other so that beads may be simultaneously formed on sheets of varying widths or lengths; a machine having a pair of lineally movable bands for gripping and feeding the sheets through the bead forming mechanism; a band mounting and supporting mechanism having pairs of wheels for supporting endless bands for lineal movement with portions in superimposed relation held in gripping contact with each other by suitable guide mechanism arranged to receive sheets between the bands and grip and feed them through the sections of the bands in superimposed relation; the adjustable mounting of the band carrying wheels to apply tension to the bands and to adjust the band carrying wheels toward or from each other to vary the space between opposed faces of the superimposed portions of the bands, or the surface contact pressure therebetween; a machine having superimposed lineally movable bands for feeding sheet material continuously through adjacently mounted forming mechanism arranged for lateral sliding movement into and out of operative position adjacent the bands, so that when the forming unit is slid into inoperative position access is provided for adjusting, removing or replacing the forming members of the unit; a machine having a forming unit for forming a tubular edge on the margin of sheet material provided with a means for tucking the edge inwardly so the surface of the sheet at the edge thereof will lie against the surface of the sheet where the bead merges into the flat portion of the sheet; a machine having means for feeding a sheet continuously therethrough during the forming operation with stationary forming units arranged to receive and progressively bend the edge of the sheet into tubular form, the forming units being mounted on a suitable slide member for movement laterally to an inoperative position where they may be inspected, replaced and repaired; a machine wherein the tubular edge forming members are assembled in a unit detachably mounted in a slide structure for lateral movement into and out of operative position on the frame of the machine to facilitate inspection, replacement and adjustment of the unit in the inoperative position; and a frame structure for mounting the feeding and forming units arranged with end members joined by center connecting members constructed to facilitate the mounting of both the feed and forming units so they are readily accessible for adjustment and replacement.

The invention includes a number of features in addition to those mentioned above, in providing for the feed of sheets to be formed with tubular beaded edges directed to feeding and control of the feeding of sheets relative to the feeding mechanism and the forming units so that the amount of material formed into the bead can be controlled in a practical and desirable manner.

In the drawings:

Fig. 2 is an end elevation of a machine showing two edge forming units adjustably mounted on the base for simultaneously forming tubular edges on the opposite sides of the same sheet.

Fig. 3 is a horizontal cross section taken on line 3—3 of Fig. 1.

Fig. 4 is a side elevation of one of the bead forming units from the opposite side of the unit as shown in Fig. 1, the scale being substantially enlarged and parts being omitted, broken away and illustrated in section, for convenience in illustrating the details of construction of the mechanism for feeding and forming tubular beads on the margins of sheets.

Fig. 5 is a vertical cross section taken on line 5—5 of Fig. 1.

Fig. 6 is a horizontal cross section through one forming unit taken on line 6—6 of Fig. 4.

Fig. 7 is an enlarged fragmentary side elevation showing the inside faces of the forming and cooling units, adjacent portions of the supporting frame, and the structure for mounting the forming unit on the frame for slidable movement into and out of operative position.

Fig. 8 is a vertical cross section taken on line 8—8 of Fig. 1.

Fig. 9 is an enlarged vertical cross section taken on line 9—9 of Fig. 4.

Fig. 10 is a front elevation of the forming unit.

Fig. 11 is an end elevation of the right-hand end of the forming unit as shown in Fig. 10.

Fig. 12 is an end elevation of the left-hand end of the forming unit as shown in Fig. 10.

Fig. 13 is a plan view of the main bending strip.

Fig. 14 is a side elevation of the main bending strip.

Fig. 15 is a side elevation of a preliminary complementary forming member cooperating with the main forming strip shown in Fig. 13 where the forming of the bead on the margin of a sheet begins.

Fig. 16 is a plan view of the complementary forming member shown in Fig. 15.

Fig. 17 is a side elevation of another complementary forming strip that cooperates with the strip shown in Fig. 13 at the beginning of the forming operation.

Fig. 18 is a plan view of the strip shown in Fig. 17.

Fig. 19 is a plan view of a beading member cooperating with the trailing end of the main bending strip in completing the formation of a tubular edge on a sheet.

Fig. 20 is a side elevation of the forming side or face on the beading member shown in Fig. 19.

Fig. 21 is an end elevation of the leading end of the beading member shown in Fig. 19.

Fig. 22 shows the spacer block used between the trailing end of the main bending strip and the top portion of the body of the forming unit in side elevation.

Fig. 23 is a bottom plan of the spacer block shown in Fig. 22.

Fig. 24 is a cross section taken on line 24—24 of Fig. 10.

Fig. 25 is a cross section taken on line 25—25 of Fig. 10.

Fig. 26 is a cross section taken on line 26—26 of Fig. 10.

Fig. 27 is a cross section taken on line 27—27 of Fig. 10.

Fig. 28 is a cross section taken on line 28—28 of Fig. 12.

Figure 1:
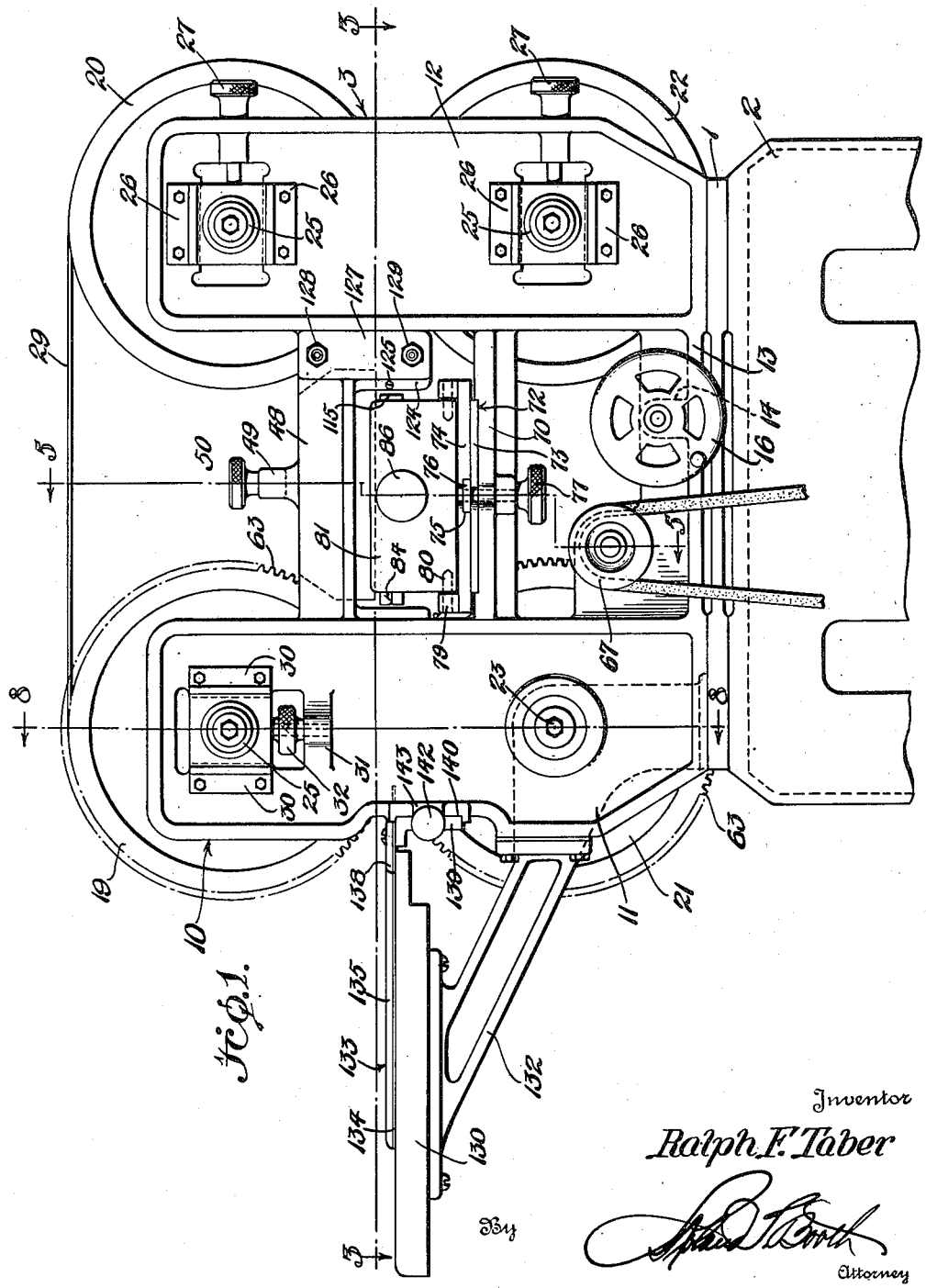
Fig. 1 is a side elevation of an edging machine constructed according to the invention showing the outer side of a tubular edge forming unit.

The machine has a base 1 provided with angular seat portions for receiving the upper ends of supporting legs 2, as shown in Figs. 1 and 2.

A pair of tubular edge forming units are provided by the invention. One is formed in opposite relation to the other in order that both will form beads on opposite edges of the same sheet at the same time. These units are indicated by numerals 3 and 4, respectively, see Fig. 2. These units are oppositely formed with the parts of otherwise duplicate construction. It is believed a description of one will be sufficient to describe the other. These units 3 and 4 are both mounted on base 1, unit 3 being mounted in a fixed position on base 1 while unit 4 is slidably mounted so that it may be adjusted toward and away from unit 3 in order that it may be used for simultaneously beading the opposite edges of sheets of different sizes.

Unit 4 has a frame 5 formed with flat bottom faces slidably seated on flat top faces of base 1. Transverse slots 6 in base 1 slidably receive depending transverse ribs 7 projecting downwardly from the bottom of frame 5. Two or more slots 6 and ribs 7 may be used as found desirable to effectively guide frame 5. Clamping bar 8 having clamping screw 9 threaded therein is arranged in the bottom of frame 5 to operate across ribs 7 for clamping frame 5 rigidly in adjusted position on base 1.

Stationary forming unit 3 has frame 10 substantially similar in construction to frame 5, but oppositely formed. Frame 10 has a pair of end members 11 and 12 respectively mounted in spaced parallel relation and extending upwardly from bottom portion 13 seated on base 1 as shown in Figs. 1 and 2. This frame 10 is suitably bolted or otherwise secured to base 1.

Bottom portion 13 connects the lower ends of end members 11 and 12, see Fig. 1, and intermediate these end members it is provided with bearing 14, see Fig. 2, rotatably mounting adjusting shaft 15. The mounting of shaft 15 in bearing 14 is constructed so that the shaft will not have endwise movement in bearing 14. A hand wheel 16 is provided for manually rotating shaft 15. Shaft 15 is provided with external screw threads having threaded engagement in boss 17 forming part of frame 5 of unit 4. The opposite end of shaft 15 has a rotatable bearing in bearing block 18 mounted on base 1. When the clamping bar and screw members 8 and 9, respectively, are loosened, manual rotation of hand wheel 16 will move slidable forming unit 4 toward or away from unit 3. When the proper position for unit 4 relative to unit 3 is obtained clamping screw 9 may be again actuated to effectively clamp unit 4 in position on base 1 against adjustment.

Each unit is provided with a sheet feed construction formed in opposite relation to the other as above stated and a description of the sheet feeding construction on one unit will be sufficient to describe both. The sheet feeding construction of unit 3 will be described and similar numerals will be applied to corresponding parts on both units.

Two pairs of wheels are provided the upper pair being indicated by the numerals 19 and 20, respectively, while the lower pair are indicated by the numerals 21 and 22 respectively. Wheels 19 and 21 are in juxtaposed relation to each other, as are wheels 20 and 22. Wheels 19 and 21 are at the feed or front end of the machine where sheets to be formed are fed into the machine.

Wheel 21 is rigidly mounted on shaft 23, see Fig. 8, having a roller bearing rotatably mounting said wheel at one end on frame 3. Each of wheels 19, 20 and 22 is mounted on a stub shaft 24 rotatable at opposite ends in bearings carried in the ends of shaft housing 25, see Fig. 6. Each shaft housing 25 is formed to slidably engage in guideways formed in end members 11 and 12 arranged so wheel 19 may be vertically adjusted and wheels 20 and 22 may be horizontally adjusted on frame 10. Guide bars 26 retain said shaft housings 25 on said frame for slidable adjustment. An adjusting screw 27 for each of wheels 20 and 22 respectively, is mounted in end member 12 and has screw threaded connection with housing 25 so that upon turning of the adjusting screw 27 for wheel 22, housing 25 will be moved back and forth horizontally to change the distance between wheel 22 and wheel 21. Operation of adjusting screw 27 for wheel 20 will obtain horizontal adjustment thereof in the same manner as wheel 22.

Each of the wheels 19 to 22 inclusive has its periphery formed with an annular groove 28 formed to receive endless feed bands 29. One endless band is engaged over the pair of rollers 19 and 20 and another endless band over the pair of rollers 21 and 22, respectively. By the adjustment of screws 27 the bands can be placed under tension of the desired degree for securing their efficient operation.

Shaft housing 25 for wheel 19 is guided by vertically extending guide bars 30 while projection 31 on end member 11 has adjusting screw 32 threaded therein for rotation to move vertically for adjusting wheel 19 to vary the spacing and contact pressure between the peripheries of wheels 19 and 21 and bands 29. The vertical adjustment of wheel 19 by screw 32 controls the initial gripping and feed pressure on the sheets to be beaded.

Bands 29 each have portions thereof extending between the adjacent peripheries of wheels 19 and 21 to the adjacent peripheries of wheels 20 and 22 in contact with each other. The superimposed contacting portions of these bands provide a gripping and feeding means for gripping and conveying a sheet therewith through the machine from the front to the rear.

These bands are accurately supported and guided throughout the superimposed portions that extend between the front wheels 19 and 21, and the rear wheels 20 and 22, respectively. A stationary roller housing 35 has its opposite ends bolted to posts projecting from bosses 36 formed on end members 11 and 12 respectively, as shown in Figs. 4, 6 and 7. A plurality of ball bearing rollers 37 are mounted in roller housing 35 throughout the length thereof with their axes lying in the same plane so that their peripheries engage the under surface of band 29 where it extends between wheels 21 and 22 so as to support the contacting horizontal portions of both bands 29 to prevent their downward flexing and to maintain them in a straight condition. At the forward and rear ends of bearing housing 35 are smaller bearing rollers 38 having their peripheries tangent to the same horizontal plane as the peripheries of bearing rollers 37 as shown in Fig. 4, for cooperation with rollers 37 for supporting the feed bands in horizontal relation.

Above bearing housing 35 and the superimposed portions of bands 29, there is arranged a top bearing member 40 formed with a plurality of cylinders 41 opening through the lower face and slidably receiving plungers 42 carrying bearing rollers 43 in the lower ends thereof having their peripheries in rolling engagement with the top surface of upper feed band 29 throughout the portion in superimposed relation with the lower band. Rollers 43 have their axes in vertically aligned relation with the axes of rollers 37 in roller housing 35. Compression springs 44 are mounted one in each cylinder 41 above plungers 42 for normally urging said plungers downwardly to maintain the peripheries of rollers 43 in engagement with the superimposed portions of feed bands 29.

Top bearing member 40 is secured to slide block 45 formed to provide vertically extending guide ribs 46 at the side edges thereof. Guide ribs 46 are slidably mounted for vertical sliding movement in guideways formed in bearing block 47. Bearing block 47 is bolted or otherwise detachably secured to the horizontal cross member 48 forming part of frame 10. Cross member 48 joins the central portions of end members 11 and 12, see Fig. 1.

Bearing block 47 has a projection 49, see Fig. 5, on the upper central portion thereof formed to provide a bearing for mounting adjusting screw 50 in threaded relation therein. Adjusting screw 50 may be rotated for screw threaded movement up and down in bearing projection 49 to engage the end with the upper edge of slide member 45 for adjusting its position relative to bearing block 47 in vertical relation against the tension of compression springs 51 normally adapted to move slide member 45 and top bearing member 40 upwardly. This upward movement will reduce the tension on compression springs 44 and thereby reduce the pressure exerted by rollers 43 to hold the superimposed portions of bands 29 in contacting relation for gripping and feeding sheets. By adjusting screw 50 the tension of compression springs 44 can be adjusted to obtain the desired amount of gripping pressure between bands 29.

As shown in Fig. 5 plungers 42 have their rear faces provided with recessed portions 52 for receiving a retaining bar 53 mounted in top member 40 for limiting the movement of plungers 42 under the action of springs 44. Bar 53 provides a means for limiting the projection of plungers 42 from the lower end of top member 40 so that when screw 50 is operated into raised position in bearing member 49, springs 51 will elevate top bearing member 40 with slide member 45 to the upper position and disengage rollers 43 from the superimposed portions of bands 29. In addition, this bar 53 also facilitates the assembly of the plungers in member 40 and the attachment of the assembled structure, or the removal thereof, in a convenient manner, from its mounted position on guide block 47.

Additional pressure and guide rollers are mounted beyond opposite ends of top bearing member 40 as indicated at 54 in Figs. 4 and 6. These rollers 54 are arranged in pairs to cooperate with the pairs of rollers 38. Rollers 54 are rotatably mounted in frames 55. Each frame 55 is carried by a vertically extending guide member 56 slidably mounted in guideways 57 formed on bosses 36 and retained in said guideways by set screws 58 extending through slots in the guide member. Springs 59 secured on end members 11 and 12, respectively, by screws 60 have the ends engaged with the top portions of guide members 56. These ends are urged downwardly by the resiliency of the springs to normally force guide members 56 downwardly to maintain rollers 54 in bearing engagement with the superimposed portions of bands 29 on the opposite side from rollers 38, to effectively maintain said bands in firm engagement with one another. A cam screw 61 is rotatably mounted on each boss 36 in a slotted portion 62 of guide member 56. This cam screw may be rotated for engaging the adjacent portion of guide member 56 to elevate the guide member against the tension of spring 59 for disengaging rollers 54 from contact with feed bands 29. This renders rollers 54 inoperative and thereby facilitates application and removal as well as adjustment of bands 29.

The bands 29 are power driven from wheels 19 and 21 respectively. Peripheral portions of wheels 19 and 21 respectively, are formed to provide gears 63, Figs. 4 and 5. The gears 63 on each wheel 19 and 21 intermesh so the wheels are driven uniformly in opposite directions in order to feed bands 29 into contacting relation for movement in the same direction together throughout the superimposed portions thereof. A drive shaft 64 carries a pinion 65 on one end thereof meshing with gear 63 on wheel 21. Drive shaft 64 is mounted in spaced bearings as shown in Fig. 5 at the ends of housing 66. Housing 66 is mounted on a vertically extending web portion on bottom portion 13. The opposite end of drive shaft 64 from pinion 65 carries pulley 67, see Fig. 2, driven by a belt or other suitable means from a source of power, such as an electric motor, not shown, carried by the legs 2 in any convenient manner.

It will be seen from the above described construction of the feeding mechanism that bands 29 are adapted to receive sheet material fed in between the bands through introduction at the left-hand side of Fig. 4, between the peripheries of wheels 19 and 21 and the outer portions of the bands supported thereon, so that as soon as the sheet material reaches a point about on a line between the axes of wheels 19 and 21 the adjacent faces of bands 29 will engage opposite surfaces of the sheet material and firmly grip the same due to the bands being adjusted into contacting or substantially contacting relation for this purpose. The adjustment of the relative positions of the surfaces of the bands 29 to each other is governed by the adjustment of screw 33 for the desired thickness of sheet material to be fed through the machine. The sheet material is therefore gripped between the bands as it passes between the wheels 19 and 21. This gripping is firmly maintained through the spring pressure exerted upon rollers 43 and 54 for constantly moving the bands into contact with one another under pressure as they are supported and guided by rollers 37 and 38. The sheet will therefore be firmly gripped as it passes between the superimposed portions of the bands and rollers 43 and 37, for example, in a manner that it will not turn or slip during its movement through the machine until it reaches wheels 20 and 22. As the sheet passes wheels 20 and 22 it will be discharged to the rear of these wheels, or to the left thereof as viewed in Fig. 4.

The axes of wheels 21 on units 3 and 4 are in aligned relation, in fact shaft 23 is extended, as shown in Fig. 8, through wheel 21 of forming unit 4 which is of slightly different construction so that this shaft may be used to drive wheel 21 of unit 4.

This driving arrangement is obtained by rotatably mounting wheel 21 of forming unit 4 on sleeve 68 having a bearing mounted at 69 in frame 5. Only one bearing roller mounting is required, due to the fact, that sleeve 68 slidably receives shaft 23 through which it is driven by key and slot connection. The key way connection between shaft 23 and wheel 21 of unit 4 provides for the adjustment of unit 4 toward and away from unit 3 without disconnecting the drive since sleeve 68 readily slides axially on shaft 23. The wheels 21 of both units 3 and 4 are driven in unison by shaft 23.

The forming means or members of the forming unit for providing a tubular edge or bead on sheet material will now be described.

A connecting member 70 extends between end members 11 and 12 of frame 10 below connecting bar 48 as shown in Figs. 4 and 5. This connecting member 70 has a lip 71 extending inwardly from one side thereof. Connecting member 70 and lip 71 have the upper surface of the central portion recessed to provide the transversely extending guideway indicated by the numeral 72. A guide plate 73 is slidably mounted in guideway 72 and is attached by screws or the like to carrier 74 mounted on the top face thereof.

Carrier 74 has a transversely extending channel 75 formed therein to receive clamping strip 76 having clamping screw 77 threaded therein and manually operable to draw clamping block 76 into tight engagement with plate 73 and lock it against movement transversely in guideway 72. Plate 73 is formed with a transversely extending slot to receive clamping screw 77 in order to provide for the transverse movement of the carrier relative to connecting member 70, as shown in Fig. 5. The slot is positioned so as to limit the lateral movement of the carrier toward the outside of the unit. A stop member 78 mounted on the inner end of lip 71 serves to limit the inward movement of the carrier in a predetermined position.

Carrier 74 is provided with bearing projections 79 having inwardly extending bearing pins 80 shown in dotted lines in Figs. 4 and 5 rotatably supporting carrier block 81 above carrier 74. Carrier block 81 is provided with passage 82 for receiving and mounting the heating element and controlling element therefor and with a channel 83 for detachably receiving and supporting the heating and forming members dies 84 and 85, respectively.

A handle 86 of material substantially nonconductant to heat is mounted on carrier block 81 and is adapted for manual gripping to slide carrier block 81 and carrier 74 back and forth in guideway 72 and also for rocking carrier block 81 about pivot pins 80 to move the inner face into upwardly extending position for providing access to heating and forming dies 84 and 85. Carrier block 81 is provided with a retaining groove 87 formed in the inner face thereof adjacent the lower edge for receiving the inturned end of positioning member or stop 78, as shown in Fig. 5. Member 78 upon engagement in retaining groove 87 accurately positions carrier block 81 with heating and forming dies 84 and 85 in the proper fixed position for the operation of the heating die in first heating the marginal portion of a sheet and then subsequently forming the margin into a tubular bead in the forming die. This positioning is also controlled by positioning pins 88 mounted in carrier 74 as shown in Figs. 5 and 7. When carrier block 81 with heating and forming dies 84 and 85 respectively, are mounted in engagement with stop 78 and positioning pins 88, tightening of set screw 77 will lock carrier 74 in position for retaining these members in fixed operative position for their normal operation.

In the operation of the machine it may be desired to inspect the heating and forming dies from time to time, so as to make adjustments, or entirely remove them for replacement, or for removing particles of foreiegn material that may stick in the forming dies and interfere with their efficient operation, or for interchanging the forming dies for new ones of a different type or dimensions for different sizes or thicknesses of sheets or beads. The slidable mounting of carrier 74 and the rocking or pivotal mounting of carrier block 81 on the carrier provides for the movement of the carrier and the carrier block into the dot-dash lines position indicated in Fig. 5. In this inoperative position the carrier block may be changed, adjusted, etc. as above mentioned, without interfering with the set up and adjustment of the machine for its normal operation. The carrier block with the forming dies may be readily returned to the normal operative position in a convenient and rapid manner with positioning bracket 78 and pins 88 controlling the resetting of heating block 81 and the carrier and forming dies so that they are accurately positioned in proper relation in the machine for efficient operation. The clamping screw 77 is tightened and loosened according to the desired operation of the carrier block and the heating and forming dies.

Heating die 84 is formed of a bottom heating block 90 mounted at the bottom of channel 83 and retained in position by a pair of securing screws engaging in threaded openings in the bottom of block 90 and extending through carrier block 81 from the bottom face thereof as indicated in dotted lines in Fig. 7. Heating die 84 has a movable top heater block 91 adapted for vertical sliding movement on pins 92 extending through guide openings in the top portion of carrier block 81. Springs 93 are normally under compression to urge heater block 91 toward and into engagement with heater block 90. These springs are held in place by engaging in recesses in the portion of carrier block 81 above channel 83. The meeting faces of heater blocks 90 and 91 have the edges rounded to remove sharp corners in order that sheet material fed between the blocks and in contact therewith will not be marred. Heating die 84 is mounted to receive the margin of a sheet to be formed in advance of forming die 85 in order to preheat the material along the margin of the sheet.

Forming die 85 is detachably retained in channel 83 by a pair of set screws 94 threaded in the top portion of carrier block 81 for engaging in sockets in the top face of forming die 85. Set screws 94 retain forming die 85 in fixed relation in carrier block 81. Forming die 85 is also heated from carrier block 81, receives the preheated marginal portion of the sheet material to be formed, and while maintaining it in heated condition, bends the marginal portion of the sheet material from flat sheet form into a tubular bead as it passes from the front end to the rear end of the forming die in the direction of feed of the sheet.

The forming die 85 comprises an elongated rectangular body 95 formed with a longitudinal channel opening through both ends and one side indicated at 96. A primary bending strip 97, see Fig. 13, has its forward end indicated at 98 secured in the lower side of channel 96 by retaining screw 99. This bending strip is then twisted throughout its central portion throughout one complete turn, with the upper face of the rear end of the strip secured against a spacing wedge 100 seated at the top part of the channel in body 95 at the rear end thereof. The rear edge of primary bending strip 97 has an extension 101 of partially cylindrical form for curling sheet material into substantially cylindrical shape.

A front secondary forming strip is indicated at 102 which is mounted in the front end of channel 96 at the upper side thereof in which position it is secured by set screws 103. This secondary forming strip is constructed as shown in Figs. 15 and 16. This secondary forming strip 102 has an initial curve forming face 104, see Fig. 16, curved both longitudinally and laterally in spaced complementary relation to the forward end of primary forming strip 97. Secondary forming strip 102 has the elongated extension at the front face of the channel indicated at 105 formed on the inner face with a longitudinally and laterally curved forming face 106, Fig. 16, complementary to and spaced from the adjacent portions of forming strip 97 in the portion which is adapted to turn the marginal portion of a sheet from the plane of the sheet into a position substantially at right angles thereto.

A flat guide strip 107, see Figs. 10, 17, 18, 22 and 23 is mounted at the bottom of channel 96 and extends from the forward end thereof to a point about one-quarter of the distance from the rear end of body 95. This guide strip 107 cooperates with forming strip 97 to provide a guide face at the forward end of the channel for the bottom face of sheets being formed by guide strip 97. The upper face of the guide strip 97 is arranged in spaced relation from the complementary forming face of secondary forming strip 102 as shown in Fig. 10 to provide a groove through which the margins of the sheets to be formed extend. Strip 107 is retained in the bottom of channel 96 by three set screws 108, shown in Fig. 10.

A complementary guide and beading block 109 is mounted in the rear bottom inside portion of channel 96. This block 109 has a lip extending outwardly to the side face of body 95 at the bottom of the channel to provide an upper surface for guiding the bottom face of a sheet being formed thereon as it leaves the face of guide strip 107. The inside portion of block 109 is formed to provide a semi-cylindrical recess portion beginning at the face of the lip and extending inwardly and upwardly to the top of the block. The top face of the block seats against the under face of the rear end of primary forming strip 97 and cooperates therewith to form a cylindrical bore at the rear end of body 95 for cooperation to complete the formation of a cylindrical tubular edge on a piece of sheet material. The upper face of the forwardly extending lip of block 109 is mounted in spaced relation from curved extension 101 to provide for the passage of sheet material therethrough and the formation of the tubular beaded edge. Securing pins 110 extend through body 95 and secure spacing wedge 100, the rear end of primary forming strip 97 and complementary beading block 109 rigidly in operative position in channel 96.

In order to insure the shaping of the margin of the sheet material into substantially true cylindrical form, a forming rod 111 has a hooked end 112 that engages in opening 113 in the upper front end of body 95. The major portion of forming rod 111 extends through slot 114 in the bottom face of secondary forming strip 102, and then rearwardly adjacent the twisted portions of primary forming strip 97 in spaced relation thereto to accommodate the marginal portion of the sheet material being formed into the beaded edge.

The rear end of forming rod 111 extends through the complementary cylindrical portion of bending block 109 and extension 101 to a point just short of the rear end as shown in Fig. 26.

This forming rod cooperates with primary forming strip 97, secondary strip 102 and beading block 109 to form a cylindrical bead or tubular portion on the edge of sheet material. The bead formed by the structure will terminate with the edge of the sheet facing the surface of the flat portion of the sheet adjacent the point where the bead begins. It is desirable to turn this edge in to provide a more complete tubular beading operation.

For this purpose, there is provided a final edge tucking member 115 rigidly mounted on the end of body 95, as shown in Figs. 10 and 28. A pair of pins 116 accurately position final edge tucking member 115 on the end of body 95 so that the opening 117 will be in aligned relation with the complementary cylindrical portion of beading block 109 and extension 101. This final edge tucking member 115 has a tucking lip 118 turned inwardly into opening 117 for turning or tucking the free edge of the beaded sheet under so that the adjacent surface portion at the edge of the sheet will lie adjacent to the surface portion of the sheet where the bead begins and thereby provide a complete tubular bead on the margin of sheet material. The amount of material formed into this bead can be varied by the width of the marginal portion engaged in the forming member and bent over into the bead by the structure above described. In varying the width of the margin formed into the bead the turned-in edge will be greater or less according to the amount of material used in forming the bead and this will be controlled by lip 118.

Immediately after the sheet with the completed tubular edge formed thereon leaves forming die 85 it engages in cooling member 120. Cooling member 120 has a cylindrical passage 121 extending therethrough in aligned relation with the passage in final edge tucking member 115, and a slot 122 opening through the side face of member 120 at the bottom of the passage. This provides passages for the tubular edge and the adjacent portion of the sheet for holding the tubular edge in shape during the cooling of the material. Cooling member 120 is mounted in a supporting block 123 by means of suitable set screws and block 123 is mounted on a housing 124 formed integral with connecting member 48 adjacent frame 12. A bolt or the like 125 secures block 123 to housing 124 as shown in Figs. 1, 3 and 6. Housing 124 provides a cooling compartment 126 closed by cover 127 having water inlet and outlet connections indicated at 128 and 129 respectively.

Water or other suitable cooling medium may be passed through cooling compartment 126 for maintaining housing 124 and the adjacent portion of the frame in a cool condition for cooling block 123 and cooling member 120. In this way heat from the formed beaded sheet material is absorbed by block 120 and conducted away by the cooling medium. The material of the sheet throughout the tubular edge is thereby caused to set for permanent retention of the tubular shape.

It will be noted that feed bands 29 have the superimposed portions thereof supported and guided with one edge in close proximity to the inner faces of the heating, forming and cooling members so that sheet material gripped between bands 29 will have practically the entire portion extending from the band into the heating, forming and cooling members engaged in and formed into a tubular bead by these members.

A feed table 130 is provided at the front of the machine for feeding sheet material into the feed bands 29 and heating, forming and cooling members. Feed table 130 is mounted on supporting arms 131 and 132 respectively. Arm 131 is suitably secured to base 1 as shown in Figs. 2 and 3, while arm 132 is mounted on end member 11 at the front end of frame 10 of unit 3, as shown in Fig. 1. The rear edge of feed table 130 terminates in adjacent but spaced relation to the front edges of frames 5 and 10 of units 4 and 3, respectively, as shown in Figs. 1 and 3.

Shaft 23 has the left-hand end, as shown in Fig. 2, supported in a bearing 23' on arm 131.

A pair of guide arms 133 are slidable over the upper face of feed table 130 for receiving and slidably guiding sheet material to be formed, into the feed bands and heating, forming and cooling members. Each of the arms is constructed in the same manner but in opposite relation to the other as shown in Figs. 2 and 3. A description of one of these arms will describe both and the same numerals will be used on each arm for corresponding parts.

Each arm is formed of a bottom guide plate 134 and a top guide member 135 having the guiding edge at 136 on the inner portion formed with a rabbet 137 adapted to provide a channel between plate 134 and guide member 135 for receiving the edge of sheets to be formed, for retaining said edge in flat relation on the top surface of plate 134.

Guide member 133 has the plate 134 and guide member 135 thereof formed with foot portions 138 secured to angle member 139 mounted for horizontal sliding movement in guide channel 140 formed on the front edge of end member 11 of each supporting frame. Angle member 139 is supported in horizontally slidable relation in channel 140, as shown in Fig. 2, by a pair of spaced aligned slots receiving guide and retaining screws 141 threaded in end member 11. These screws 141 may be loosened sufficiently to provide for the sliding movement of angle member 139 in channel 140 so that each guide arm 133 may be adjusted on table 130. After this adjustment is made screws 141 are tightened to firmly clamp angle member 139 rigidly in position on end member 11 and retain the guide arm in a fixed position of adjustment.

An adjusting screw 142 is mounted in a projection 143 provided on the end member of the frame. The end of adjusting screw 142 is threaded into the end portion of angle member 139 so that rotation of screw 142 will adjust member 139 horizontally in guide channel 140. This adjustment of screw 142 will provide for the accurate adjustment of guide arm 133 on table 130 into the desired position of adjustment when screws 141 are loosened to provide for sliding movement of member 139.

The adjustment of each guide arm 133 is arranged so that the rabbet 137 will provide for the projection of a sufficient amount of the margin of a sheet to be provided with a tubular bead, beyond the plane of the outer edges of guide bands 29, so that when this margin enters the heating, forming and cooling members as above described, it will be turned into the cylindrical bead portion in the manner above described. The edge of the sheet will be turned inwardly to overlie a portion of the sheet spaced from the edge at the approximate juncture of the bead with the flat portion of the sheet. The variation of the position of guide arm 133 with respect to feed bands 29 and the heating, forming and cooling members can be controlled to vary the amount of material formed into the tubular bead to the extent limited by the dimensions of the heating, forming and cooling members and are arranged to form a sufficient amount of the edge portion of a sheet of material into the cylindrical tubular bead on the edge of a sheet so that a small marginal portion adjacent the edge of the sheet may be formed to overlie the portion of the sheet at the juncture of the bead with the flat unformed part of the sheet.

The machine herein described may be used to form tubular beads on only one edge of a sheet, or if desired, may be operated to simultaneously form beads on opposite edges of the same sheet. When one edge only of a sheet is to be formed with a tubular bead, guide arm 133 on the unit to be used, is adjusted to the desired position to obtain the formation of the desired amount of the marginal portion of the sheet into the bead. Ordinarily guide arm 133 will be maintained at this position of adjustment.

Stationary forming unit 3 will normally be used for forming only one bead on the edge of a sheet while unit 4 may be slidably moved to its outermost position so that it will not operate on a sheet being formed on one edge only although the feed bands 29 thereof may be arranged to grip the margin of the sheet for cooperation with the feed bands 29 of unit 3 in feeding sheets to be beaded on one edge only. This however is not necessary and in some cases will not be desired. A clutch, not shown, may be interposed in drive shaft 23 to disconnect unit 4 from unit 3 when not in use, or any other equivalent means may be used.

When a sheet is to be beaded on opposite edges simultaneously, edging unit 4 is slidably adjusted to the proper position so that the opposite edges of the sheets to be beaded will engage in the rabbeted portions in guide edges 136 of both guide arms 133 which have been set in the desired positions of adjustment for the beading operation.

The sheet material to be formed with the tubular bead or beads is then fed along one or between both guide arms 133 over feed table 130 into the machine so that it will be gripped by feed bands 29, the guide arms maintaining the edges of the sheet in squared relation, in which position they will be maintained by the gripping action of the bands and fed with the bands, while gripped therebetween, through the machine to the rear end. As the sheets are fed through the machine the edges projecting beyond the sides of feed bands 29 will be engaged in the heating, forming and cooling members and progressively formed into tubular cylindrical beads of substantially uniform size and shape. The size of the beads may be varied by changing the forming members and correspondingly adjusting guide arms 133 without changing other parts of the machine.

In the forming of beaded edges on sheet material such as Celluloid or other similar plastic materials, the material first has the marginal portion to be formed into a bead engaged between heater blocks 90 and 91. In the sliding movement of the edge of the material between blocks 90 and 91, it is heated to a sufficient amount to bring the material into a sufficiently plastic condition for the desired forming operation. The forming die 85 is maintained in a heated condition to keep the material of the sheet heated during the progressive forming into the cylindrical bead as it slides along primary bending strip 97 and the cooperating forming strips. During the passage of the marginal portion through forming die 85 the bead is completely formed, the final forming operation being obtained by lip 118, as hereinbefore described.

This completely formed beaded edge on the sheet is then engaged in the cooling unit which holds the bead in its formed shape while cooling the material so that it will set in the beaded form obtained by forming die 85 after which the sheet is delivered and ejected from the rear end of the machine by feed bands 29.

The heating of the forming and heating dies may be obtained in any desired manner and either manually or automatically controlled by suitable means to obtain the desired degree of heating necessary for the forming of the kind of sheet material that is to be provided with a beaded edge.

The invention claimed is:

1. An edging machine, comprising a support, a pair of endless feed bands mounted for lineal movement on said support with portions of each normally engaged in superimposed relation for travel in a straight path, guide and supporting means on said support engaging on opposite sides of said bands, and having the means at one side of said bands resiliently actuated to normally maintain the superimposed portions of said bands in contact during travel through said path, stationary forming means mounted on said support beside the superimposed portions of said bands for progressively forming a tubular bead on the margin of a sheet moved therethrough, and means for guiding a sheet between said bands at one end of said path controlling the width of margin aligned with said forming means whereby said bands will be separated and engage opposite faces of said sheet in opposed relation and move the margin thereof through said forming means to produce said tubular bead on the margin.

2. An edging machine for forming a tubular bead on the margin of sheet material having a feeding means, comprising a support, two pairs of wheels rotatably mounted on said support, an endless band mounted for lineal travel on each pair of wheels, the corresponding wheels of each pair having their axes lying in parallel planes with their peripheries in contiguous relation for supporting portions of said bands in superimposed substantially contacting relation and adapted to travel together in the same direction, a plurality of bearing and guide rollers mounted on said support for engaging the outer side of one of said bands throughout the superimposed portions thereof, a roller carrier slidably mounted on said support for perpendicular movement relative to the superimposed portions of said bands on the side opposite said first-mentioned bearing and guide rollers, a plurality of rollers having supporting elements slidably mounted on said carrier for movement relative thereto toward and from the outer side of the other band in said superimposed portions opposite to said first-mentioned rollers, resilient means on the roller carrier for normally projecting said supporting elements and rollers thereon toward said bands for normally retaining said bands engaged under pressure between said rollers in the superimposed portions thereof, and means on the support engaging the carrier operable for adjusting the position of said roller carrier on the support to vary the pressure applied on said bands.

3. A machine for forming a tubular edge on sheet material comprising a pair of upstanding spaced parallel coplanar end members, cross members extending between and joining said end members intermediate the ends thereof, a pair of wheels rotatably mounted on each end member in spaced relation to one side thereof, the wheels of each pair being in coplanar relation one above the other, a pair of narrow endless bands, one band being mounted on the top wheels of each pair and the other band being mounted on the bottom wheels of each pair, said bands having substantially straight adjacent and lineally movable portions extending in spaced parallel edgewise relation to said side of said end members, means mounted on one of said cross members in spaced parallel relation at the side of said cross members for engaging and resiliently retaining said straight portions of said bands in engaged relation for holding a sheet therebetween and moving a held sheet therewith along one side of said members in perpendicular relation to said side of said members, and means having a passage therein formed to receive the margin of a sheet held and moved therethrough by said bands and having parts in said passage to form said margin into a tubular edge portion on said sheet mounted on one side of one of said cross members adjacent the edge of the straight portions of said bands.

4. A machine for forming a tubular edge on sheet material comprising a pair of upstanding spaced coplanar end members, cross members extending between and joining said end members intermediate the ends thereof, a pair of wheels rotatably mounted on each end member in spaced relation to one side thereof, the wheels of each pair being in coplanar relation one above the other, a pair of narrow endless bands, one band being mounted on the top wheels of each pair and the other band being mounted on the bottom wheels of each pair, said bands having substantially straight adjacent and lineally movable portions extending in spaced parallel edgewise relation to said side of said end members, means mounted on one of said cross members in spaced parallel relation at the side of said cross members for engaging and resiliently retaining said straight portions of said bands in engaged relation for holding a sheet therebetween and moving a held sheet therewith along one side of said members in perpendicular relation to said side of said cross members, another of said cross members being formed with a transversely extending guideway crossing from one side thereof to the other, a carrier slidably mounted in said guideway for transverse movement to opposite sides of said cross members between said end members, means for positioning said carrier in a predetermined relation to said bands at one end of said guideway, and means mounted on said carrier formed in a position aligned with said straight portions of said bands for receiving the margin of a sheet held and moved by said bands for forming said margin into tubular form when said carrier is engaged with and positioned by said positioning means.

5. A machine for forming a tubular edge on sheet material comprising a pair of upstanding spaced parallel coplanar end members, cross members connecting said end members intermediate the ends thereof, a pair of endless bands mounted in spaced parallel relation on an upright side of said members one above the other in edgewise relation to said side for lineal movement with adjacent substantially straight portions in opposed relation, means on one of said cross members for supporting and normally retaining said straight portions of said bands in engaged relation, another cross member having a transverse substantially horizontal guideway formed therein, a carrier slidably mounted in said guideway for movement to opposite sides of said cross member between said end members, forming means detachably mounted on said carrier, positioning means on the last mentioned cross member for limiting carrier movement toward said bands for gauging the position of said forming means relative to said bands, and means for guiding a sheet into said bands for engagement, holding and movement thereof by and with said bands.

6. A machine for forming a tubular edge on sheet material comprising a pair of upstanding spaced parallel coplanar end members, cross members connecting said end members intermediate the ends thereof, a pair of endless bands mounted in spaced parallel relation on an upright side of said members one above the other in edgewise relation to said side for lineal movement with adjacent substantially straight portions in opposed relation, means on one of said cross members for supporting and normally retaining said straight portions of said bands in engaged relation, another cross member having a transverse substantially horizontal guideway formed therein, a carrier slidably mounted in said guideway for movement to opposite sides of said cross member between said end members, means rotatably mounted on said carrier for forming a tubular edge in one position thereof on the margin of a sheet held and moved by the straight portions of said bands with said margin projecting therefrom in perpendicular relation toward said means and said side of said end members, said forming means being movable with said carrier in said guideway to another position at the opposite side of said end members and rotatable into another and inoperative position on said carrier spaced away from said bands, positioning means on one of said cross members for engaging and retaining said forming means in operative predetermined relation to said bands, and guide and gauging means in advance of and for feeding sheets into said bands with a free margin projecting in perpendicular relation toward the side of said end members for engagement and forming in said forming means while held and moved by said bands.

7. A machine for forming a tubular edge on sheet material comprising a pair of upstanding spaced end members in coplanar relation, cross members connecting said end members intermediate the ends thereof, one of said cross members being above another and forming an upper cross member, a pair of endless bands mounted in spaced parallel edgewise relation to an upright side on said members one above the other for lineal movement with adjacent substantially straight portions in opposed relation, means mounted on one side of said end members for supporting the straight portion of the lower band, the upper of said cross members having a vertically extending guideway formed thereon, a top bearing member slidably mounted in said guideway, bearing rollers supported for movement relative to said top bearing member engaging the straight portion of the upper band for normally retaining it engaged with the straight portion of said lower band, resilient means on said top bearing member for projecting said rollers toward said bands, means on said last mentioned cross member for engaging and adjusting said top bearing member in said guideway to vary the tension on said rollers, and forming means on another cross member adjacent one edge of the engaged portions of said bands for receiving the free margin of a sheet held and moved with said bands for forming said margin into a tubular bead.

8. A machine for forming a tubular edge on sheet material comprising a pair of upstanding spaced coplanar end members, cross members connecting said end members intermediate the ends thereof, a lower pair of wheels each rotatably mounted on an upright side of one of said end members, a pair of bearing members each slidably mounted in the upper portion of one end member one of said bearing members having vertical sliding movement, adjusting means connected with each bearing and end member for moving said bearing members and retaining them in adjusted position, an upper pair of wheels each rotatably mounted on one of said bearing members and arranged at one side of said end members above the lower wheels on said end members, all of said wheels being in coplanar relation parallel to said end members, a pair of narrow endless bands, one engaged over the peripheries of said lower wheels and the other over the peripheries of said upper wheels for lineal movement with straight portions in opposed adjacent relation extending between the end members in substantially horizontal relation edgewise to the sides of said members, bearing means positioned below the straight portions of both of said bands for supporting both of said straight portions of said bands, a vertical guideway formed on said cross member, a top bearing member slidable in said guideway above and toward and from the straight portions of said bands, adjusting means engaging said top bearing and cross members operable to adjust the position of said top bearing member in said guideway, bearing rollers having supports slidably mounted in said top bearing member, said bearing rollers engaging the straight portion of the upper endless band for normally retaining it in engaged relation with the lower band and bearing means, and forming means mounted on one of said cross members for forming the free margin of a sheet held by said bands into a tubular portion, the adjustment of the bearings for the upper wheels cooperating with said top bearing member and its adjustment to retain the adjacent straight portions of said bands engaged throughout the entire length thereof for effectively holding sheets therebetween.

9. A machine for forming tubular edges on sheet material comprising a horizontal base, a pair of upright frames mounted on said base in spaced parallel relation, one frame being slidable horizontally on said base toward and from the other, each frame having a pair of endless bands mounted in spaced parallel edgewise relation to the vertical side of the frame facing the opposite frame, the bands of each pair being mounted one above the other for lineal movement and having straight portions engaged in horizontally extending relation from the front to the rear of said frames, a horizontal feed table in front of said frames having guide means for guiding sheets into and between pairs of bands with free margins projecting toward said frames from said bands, and means mounted on said frames outwardly of said bands for forming opposite margins into tubular beads while held and moved from the front to the rear of said frames.

10. An edging machine, comprising a frame, a pair of bands having normally engaged straight portions extending from one end to the other end of said frame, means normally holding said straight portions of said bands in contact, means for lineally moving the straight portions of said bands in one direction, said bands and both of said means cooperating in holding the marginal portion of a sheet between said bands against movement relative to said bands and moving a held sheet therewith across said frame from one end to the other, means for progressively forming the margin of a sheet into tubular form while held and moved by the straight portions of said bands mounted on said frame in fixed contiguous relation to one edge of said straight portions of said bands, and means in advance of the straight portions of said bands for guiding a sheet into position between said straight portions of said bands for controlling the width of the margin of a fed sheet projecting beyond said edge portions of said bands for forming into a tubular edge by said forming means.

11. An edging machine, comprising a frame, a pair of bands having normally engaged straight portions extending from one end to the other end adjacent said frame, means normally holding said straight portions of said bands in contact, means for lineally moving the straight portions of said bands in one direction, said bands and both of said means cooperating in holding the marginal portion of a sheet between the straight portions of said bands against movement relative to said bands and moving a held sheet therewith across said frame from one end to the other, means mounted on said frame contiguous to one edge of said bands formed with a channel to receive the margin of a sheet held and moved by said bands, means in said channel of the last-mentioned means for progressively forming the margin of said sheet into tubular form, said last-mentioned means having parts cooperating for tucking the edge of said sheet under and into outwardly extending relation within said tubular portion on said sheet, and means in advance of the straight portions of said bands for guiding a sheet into position between said straight portions of said bands for controlling the width of the margin of a fed sheet beyond said edge portions of said bands for forming into a tubular edge.

RALPH F. TABER.